United States Patent [19]

Bluhm et al.

[11] Patent Number: 5,030,533
[45] Date of Patent: Jul. 9, 1991

[54] PHOTOCONDUCTIVE IMAGING MEMBERS WITH LIQUID CRYSTALLINE THERMOTROPIC POLYMERS

[75] Inventors: Terry L. Bluhm; Pudupadi R. Sundararajan, both of Oakville; Guerino Sacripante, Cambridge; Dasarao K. Murti, Mississauga, all of Canada

[73] Assignee: Xerox Corporation, Stamford, Conn.

[21] Appl. No.: 441,741

[22] Filed: Nov. 27, 1989

[51] Int. Cl.$^5$ .................. G03G 5/047; G03G 13/22
[52] U.S. Cl. ...................................... 430/59; 430/126
[58] Field of Search ........................................ 430/59

[56] References Cited

U.S. PATENT DOCUMENTS 4,265,990  5/1981  Stolka et al. ..................... 430/59
4,543,313  9/1985  Mahabadi et al. ................ 430/109

Primary Examiner—Roland Martin
Attorney, Agent, or Firm—E. O. Palazzo

[57] ABSTRACT

A photoresponsive imaging member comprised of a photogenerating layer, and a charge transport layer comprised of hole transport molecules dispersed in a resin binder mixture wherein at least one of the resins is a liquid crystalline thermotropic polymer.

46 Claims, 11 Drawing Sheets

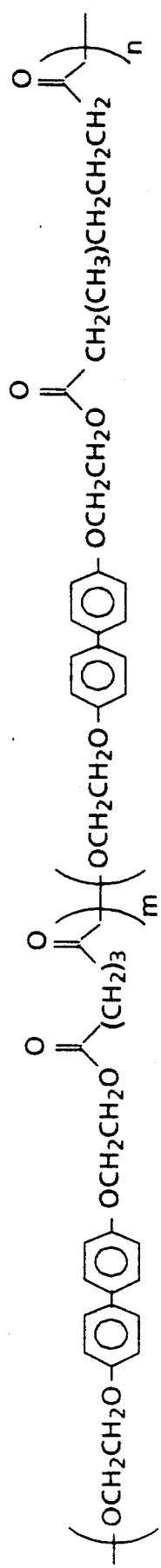
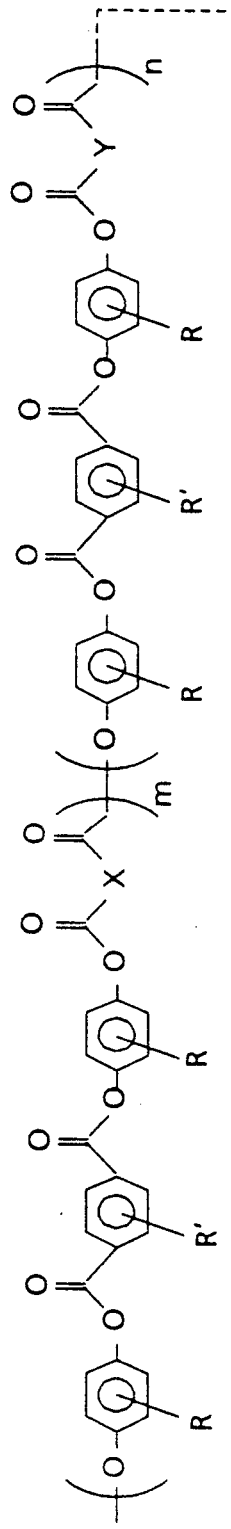
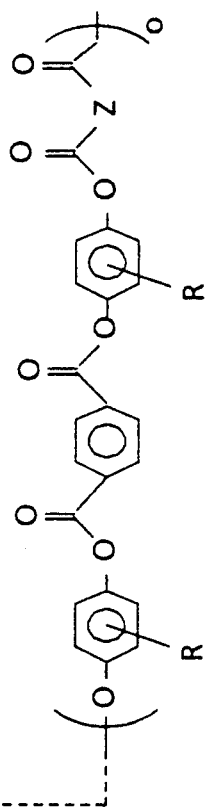
FIG. 15
FIG. 16

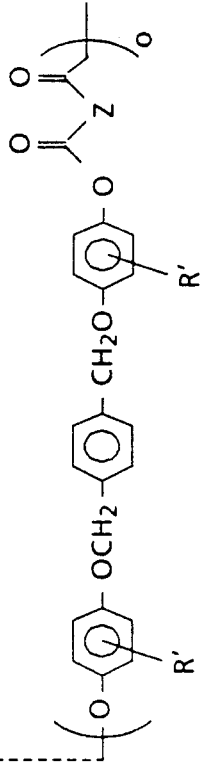

PHOTOCONDUCTIVE IMAGING MEMBERS WITH LIQUID CRYSTALLINE THERMOTROPIC POLYMERS

BACKGROUND OF THE INVENTION

This invention is generally directed to photoresponsive imaging members, and more specifically to layered photoconductive members. In one embodiment of the present invention, there are provided photoconductive layered imaging members comprised of a photogenerating layer with, for example, inorganic or organic photogenerating pigments, a charge or hole transport layer comprised of, for example, aryl amines as illustrated in U.S. Pat. No. 4,265,990 and U.S. Pat. No. 4,925,760, the disclosures of which are totally incorporated herein by reference, and wherein the hole transport molecules are dispersed in a resinous binder containing a liquid crystalline polymer. Further, in one embodiment of the present invention there is provided a photoresponsive imaging member or device comprised of a supporting substrate, a photogenerating layer, and a hole transport layer comprised of hole transport molecules dispersed in a resin binder comprised of various inactive resins such as polycarbonates and a liquid crystalline polymer, which polymer avoids, inhibits, or minimizes the undesirable crystallization of the charge transport molecules.

Some of the prior art photoconductive imaging members, especially the hole transport molecules, such as aryl amines, crystalline after extended imaging cycles, for example, after about 10,000 cycles to about 50,000 cycles, causing undesirable image quality, that is for example images with substantial background and/or poor resolution. Moreover, crystallization can cause cracking of the photoconductive layer, hence breakdown of the photorecptor and a shortened life span. It is believed that crystallization of the charge transport molecules is encountered, for example, after extended imaging cycles because of the slow diffusion of the charge transport molecule leading to crystallization within the polymer matrix of the charge transport layer. It is an object of this invention to provide a photoconductive member wherein there is incorporated into the above charge transport layer a thermotropic liquid crystalline resin or resins dispersed with the charge transport molecule and a resin binder thereby affording the aforementioned disadvantage. More specifically, with the aforementioned liquid crystalline resin there is avoided or minimized the diffusion of the charge transport molecule, hence crystallization of the charge transport molecule after extended imaging cycles of, for example, from about 50,000 to about 200,000 cycles is avoided or minimized. Furthermore, the minimization of the above mentioned crystallization avoids or minimizes the cracking of the photoreceptor belt, thereby increasing the lifetime expectancy of the photoconductive or photoreceptor layer to, for example, beyond 200,000 cycles in an embodiment of the present invention. Accordingly, the minimization or avoidance of crystallization of the charge transport molecules results in layered photoconductors of high sensitivity, low dark decay values, low residual potentials, and wherein these photoconductors possess high cyclic stability after an extention of imaging cycles, for example, from about 50,000 cycles to above 200,000 cycles in an embodiment of the present invention. The photoresponsive imaging members of the present invention can be selected for various electrophotographic imaging and printing processes, especially xerographic processes wherein, for example, latent images are formed thereon followed by development, transfer to a suitable substrate, and fixing by heat and/or heat and pressure.

Layered imaging members with hole transport layers are known, reference for example U.S. Pat. No. 4,265,990. These members are generally comprised of a supporting substrate, a photogenerating layer, and a charge transport layer wherein the charge or hole transport molecules thereof are dispersed in a resin binder, such as a polycarbonate. One problem associated with these members, especially when the hole transport molecules are comprised of certain aryl amines dispersed in a resin binder, is the undesirable crystallization thereof, which disadvantage is avoided or minimized with the imaging members of the present invention. Also, liquid crystalline polymers and their use as toner resins are known, reference U.S. Pat. No. 4,543,313, the disclosure of which is totally incorporated herein by reference. The liquid crystalline polymers of the aforementioned '313 patent can be selected as the thermotropic liquid crystalline resin for the imaging members of the present invention. Moreover, the thermotropic liquid crystalline polymers and preferably the random copolymers, and more preferably random copolyesters with three or more spacer groups therein as illustrated in copending application U.S. Pat. No. 4,891,293 entitled Toner and Developer Compositions with Thermotropic Liquid Crystalline Polymers, the disclosure of which is totally incorporated herein by reference, can be selected as the thermotropic liquid crystalline resin for the imaging member of the present invention. Examples of liquid crystalline thermotropic polymers are illustrated in FIGS. 1 to 16 attached hereto, which Figures correspond to or are substantially similar to those provided in the aforementioned copending application, wherein for FIGS. 1 and 2 X, Y and Z are independently selected from alkyl, alkylene, substituted alkyl, substituted alkylene, subject to the provision in a preferred embodiment that X, Y and Z represent different groups; m, n and o represent the number of monomer segments present in the copolymer. In FIGS. 3 to 16 m, n and o represent the number of monomer units, and R and R' independently represent hydrogen, hydroxyl, halogen, nitro, alkoxy, aryl alkoxy, alkyl and the like. Also, these may be selected as the thermotropic liquid crystalline resins for the imaging members of the present invention those crosslinked liquid crystalline resins as illustrated in copending application U.S. Pat. No. 4,973,539 entitled Toner and Developer Composition with Crosslinked Liquid Resins, the disclosure of this application being totally incorporated herein by reference. Examples of specific thermotropic liquid crystalline polymers illustrated in the aforementioned copending patent are described in FIGS. 17 and 18 submitted herewith, wherein X, Y and Z are, for example, independently selected from alkyl, alkylene, substituted alkyl and substituted alkylene subject to the provision that X, Y, and Z represent different groups; l, m, n and o represent the number of monomer segments present in the polymer; and p represents the percentage or amount of crosslinking segment with the provision that the numerical sum of l, m, n, o and p is equal to 100.

Illustrated in U.S. Pat. No. 4,315,981 are organic double layered electrophotographic recording materials comprised of an electroconductive support with a photoconductive double layer of organic materials, which consist of a homogeneous opaque charge carrier producing dyestuff layer obtained from an annealed quinone, or the substitution product thereof selected from the group consisting of dibenzopylene, quinone, anthraquinone, pyranthrone, dibenzathrone, and flaventhrone, and a transparent top layer of insulating materials of at least one charge transporting compound, which transport layer consists of a charge transporting monomer, reference for example column 2, lines 37 to 56. Further, as indicated in column 4, lines 1 to 22, as the formula 9 compound for the imaging member of the '981 patent there can be selected dibromo-8,16-pyranthrenedione (Indanthrene Orange RRTS, C.I. 59,705). Moreover, it is indicated in column 4, beginning at around line 53, that the organic dyestuff layer may be applied by vapor depositing the dyestuff in a vacuum. Also, this patent, the disclosure of which is totally incorporated herein by reference, discloses a number of resinous binders for the charge transport layer including polycarbonate resins, reference column 7. Further, in U.S. Pat. No. 3,871,882 there are disclosed layered electrophotographic recording materials containing an electroconductive support material and a photoconductive double layer of organic materials, reference for example the Abstract of the Disclosure. Other representative patents of background interest include 3,871,882 and 3,973,959.

In Konishiroku Kokai Japanese 59/184349/A2[84/184349], Oct. 19, 1984, there is disclosed the use of selected pyranthrones as charge generator layers in conjunction with hydrazone charge transport layers. Specifically, a solution coated dispersion of dibromo-8,16-pyranthrenedione in a polymer binder can be selected as the charge generator layer. Also, in U.S. Pat. No. 3,877,935 there are disclosed imaging members with dibromo-8,16-pyranthrenedione vacuum coated charge generator layers contiguous with poly(vinyl carbazole) charge transport layers.

Also of interest are U.S. Pat. Nos. 4,028,102; 4,399,207; 4,454,211; 4,554,231 and 4,714,666. In the '102 patent, there are illustrated diamine condensation products in double layered photoconductive recording elements with charge transports. More specifically, there is disclosed in the '102 patent condensation products of o-phenylamine diamine or 1,8-diaminylnaphthyline and 4,10-benzothioxanthrene-3,1'-dicarboxylic anhydride of the formulas as illustrated in column 2, and of the formulas 1 to 5, reference column 3, beginning at line 55. The '207 patent discloses electrophotographic photosensitive members with hydrozone compounds of the formula, for example, as illustrated in the Abstract of the Disclosure and in column 2. Examples of charge generating layer materials are illustrated beginning in column 16, line 65, and include, for example, phthalocyanine pigments, perylene pigments, and the like, typical examples of which are specifically recited in columns 17 through 26. The '211 patent discloses electrophotographic photosensitive members with pyrazoline charge transport materials, see for example column 2, beginning at line 35. Specific organic photoconductive materials or change transporting materials for use in the invention of the '211 patent are illustrated according to the teachings thereof in columns 3and 4, formulas 1 and 2. Charge generating layers for the photoconductive members in the '211 patent are illustrated in column 42, beginning at line 11, and include, for example, organic substances such as perylium dyes, thioperylium dyes, perylene pigments, and the like with specific examples of charge generating materials being illustrated in columns 42 to 52. Also, it is disclosed in column 57 that a charge generating layer can be formed on aluminum plate by the vacuum deposition of a perylene pigment having carbon atom bridges at the 1, 12 and 6, 7 positions of the common perylene molecule. In U.S. Pat. No. 4,554,231, the disclosure of which is totally incorporated herein by reference there is illustrated an electrophotosensitive member comprised of a layer containing a hydrazone compound of the formula, for example, as illustrated in the Abstract of the Disclosure, which hydrazone compound is selected as charge transport material, reference column 5, line 30, and wherein there are selected various charge generations layer materials including, for example, perylium dyes, thioperylium dyes, perylene pigments and the like, see column 6, beginning at line 23, and note particularly columns 7 through 12. In U.S. Pat. No. 4,714,666, there are illustrated perylene tetracarboxylic acid imide pigments as electrophotographic recording materials, which pigments include those, for example, as represented by the formula 1, reference the Abstract of the Disclosure, and charge transport components.

Moreover, in U.S. Pat. No. 4,587,189, the disclosure of which is totally incorporated herein by reference, there are illustrated layered imaging members with photoconductive layers comprised of cis and transbis(-benzimidazo)perylene pigments, and aryl amine hole transport layers wherein the amine can be dispersed in various resin binders such as polycarbonates.

Additionally, numerous different xerographic photoconductive members are known including, for example, a homogeneous layer of a single material such as vitreous selenium, or a composite layered device containing a dispersion of a photoconductive composition. An example of one type of composite xerographic photoconductive member is described, for example, in U.S. Pat. No. 3,121,006 wherein there are disclosed finely divided particles of a photoconductive inorganic compound dispersed in an electrically insulating organic resin binder.

There are also known photoreceptor materials comprised of inorganic or organic materials wherein the charge carrier generating, and charge carrier transport functions are accomplished by discrete contiguous layers. Additionally, layered photoreceptor materials are disclosed in the prior art which include an overcoating layer of an electrically insulating polymeric material. However, the art of electrophotography continues to advance and more stringent demands need to be met by the copying apparatus to, for example, increase performance standards, and to obtain quality images. Also, there have been disclosed other layered photoresponsive devices including those comprised of separate generating layers, and transport layers as described in U.S. Pat. No. 4,265,990 mentioned herein, the disclosure of which is totally incorporated herein by reference. Examples of photogenerating layers disclosed in this patent include trigonal selenium and phthalocyanines, while examples of transport layers include certain diamines as mentioned herein.

Many other patents are in existence describing photoresponsive devices including layered devices containing generating substances, such as U.S. Pat. No. 3,041,167 which discloses an overcoated imaging member containing a conductive substrate, a photoconductive layer, and an overcoating layer of an electrically insulating polymeric material. This member is utilized in an electrophotographic copying system by, for example, initially charging the member with an electrostatic charge of a first polarity, and imagewise exposing to form an electrostatic latent image, which can be subsequently developed to form a visible image.

Furthermore, there are disclosed in U.S. Pat. No. 4,232,102 and 4,233,383 photoresponsive imaging members comprised of trigonal selenium doped with sodium carbonate, sodium selenite, and trigonal selenium doped with barium carbonate, and barium selenite, or mixtures thereof. Moreover, there are disclosed in U.S. Pat. No. 3,824,099 certain photosensitive hydroxy squaraine compositions. According to the disclosure of this patent, the squaraine compositions are photosensitive in normal electrostatographic imaging systems. The disclosures of each of the aforementioned patents are totally incorporated herein by reference.

In U.S. Pat. No. 4,508,803, the disclosure of which is totally incorporated herein by reference, there is described an improved photoresponsive device comprised of a supporting substrate, a hole blocking layer, an optional adhesive interface layer, an inorganic photogenerating layer, a photoconducting composition layer comprised of benzyl fluorinated squaraine compositions, and an aryl amine hole transport layer. Other representative patents disclosing photoconductive devices with squaraine components and hole transports therein include U.S. Pat. Nos. 4,507,408; 4,552,822; 4,559,286; 4,507,480; 4,524,220; 4,524,219; 4,524,218; 4,525,592; 4,559,286; 4,415,639; 4,471,041 and 4,486,520. The disclosures of each of the aforementioned patents are totally incorporated herein by reference.

Moreover, disclosed in the prior art are composite electrophotographic photosensitive materials with various azo compounds. For example, there is illustrated in Japanese Ricoh Patent Publication 6064354, published Apr. 12, 1985, composite photoconductors wherein one of the photoconductor layers contains an azo compound of the formulas as illustrated. Further, there are illustrated in several U.S. patents and publications layered organic electrophotographic photoconductor elements with azo, bisazo, or related compounds. Examples of these patents and publications include U.S. Pat. Nos. 4,400,455; 4,551,404; 4,390,608; 4,327,168; 4,299,896; 4,314,015; 4,486,522; 4,486,519 and 4,551,404; and Konishiroku Japanese Patent Laid Open Publication 60111247.

Other prior art that may be of background interest includes Japanese Patent 59-59686; Japanese Patent 59-154454; European Patent 100,581; U.S. Pat. No. 4,578,334; European Patent 40,402; U.S. Pat. No. 4,431,721; German Patent 3,110,954; R. O. Loutfy, *Can. J. Chem* 59, 544, (1981); and F. Graser and E. Hadicke, *Liebigs Ann. Chem.*, 483 (1984).

Although photoconductive imaging members are known, there remains a need for improved imaging members. Additionally, there continues to be a need for layered photoresponsive imaging members comprised of, for example, arylamine hole transport components dispersed in a mixture of resins, one of which is a liquid crystalline polymer, such as those illustrated in the copending applications and patents mentioned herein, the disclosures of which have been totally incorporated herein by reference, which members will enable the generation of acceptable high quality images and wherein these members can be repeatedly used in a number of imaging cycles without deterioration thereof from the machine environment or surrounding conditions, and wherein crystallization of the hole transport molecules is avoided or minimized. Moreover, there is a need for improved layered photoresponsive imaging members that are substantially inert to the users of such members. Additionally, there is a need for layered photoconductors wherein cracking of a layered photoreceptor belt with a hole transport layer is avoided or minimized, especially after an extended number of imaging cycles. Additionally, there is a need for layered photoconductors of high sensitivity, low dark decay values, low residual potentials, and which possess high cyclic stability. Furthermore, there continues to be a need for photoresponsive imaging members which can be positively or negatively charged thus permitting the development of images, including color images with positively or negatively charged toner compositions. Moreover, there is a need for the fabrication of a layered photoreceptor belt, including seamless belts, whereby the charge transport layer is comprised of from about 30 percent by weight of charge transport molecules to about 60 percent by weight, and more specifically from about 35 to about 50 percent by weight dispersed in a polymer matrix. Prior art fabrication of the photoreceptor belt by solution spray coating can suffer from defects associated with charge transport molecule crystallization, a problem solved or minimized with the present invention, and can preclude the use of more than 30 to 35 percent charge transport molecule in the preparation thereof. In one embodiment of the present invention, the selection of liquid thermotropic crystalline resins as a second resin in the hole transport layer comprised of hole transport molecules dispersed in a first resin such as a polycarbonate, reference U.S. Pat. No. 4,265,990, avoids or minimizes the undesirable crystallization of the charge transport molecules thereby allowing in an embodiment of the present invention the incorporation of up to, for example, 50 percent by weight of the charge transport molecule within the charge transport layer, and wherein defects associated with crystallization are avoided or minimized during solution fabricating spray coating processes. Similarly, there is a need for the fabrication of the charge transport layer by the dip coating process, whereby the charge transport molecule is employed in an amount of from about 30 to about 60 percent, and moreover from about 35 to 50 percent dispersed in a polymer matrix.

Prior art fabrication of photoreceptor drums by dip coating may also be undesirable because of defects associated with charge transport molecule crystallization and can preclude, for example, the use of more than 30 to 35 percent of such molecules. The use of the aforementioned liquid crystalline resins in the charge transport layer avoids or minimizes the crystallization of the charge transport molecule, thereby allowing up to 50 percent or more incorporation of the charge transport molecule without defects associated with crystallization during the dip coating process of fabricating the photoreceptor belt. Also, there is a need for disposable imaging members useful in xerographic imaging processes, and xerographic printing systems wherein, for example, light emitting diodes (LED), helium cadmium or helium-neon lasers, solid state AlGaAs diode lasers can be selected; and wherein these members are particularly sensitive to the visible and near infrared region of the spectrum, that is from about 400 to about 700 nanometers.

SUMMARY OF THE INVENTION

It is an object of the present invention to provide photoresponsive imaging members with many of the advantages illustrated herein.

A further object of the present invention is the provision of improved photoconductive imaging members with high photosensitivity, low dark decay values, and excellent cyclic stability.

Another object of the present invention resides in the provision of layered photoconductive imaging members comprised of photogenerating layers and hole transport layers comprised of aryl amine molecules dispersed in a mixture of resin binders, one of which is a liquid crystalline polymer.

In yet another specific object of the present invention there are provided negatively charged layered photoresponsive imaging members comprised of photogenerating layers and hole transport layers comprised of aryl amine molecules dispersed in a mixture of resin binders, one of which is a liquid crystalline polymer.

There are provided in another object of the present invention positively charged layered photoresponsive imaging members with a top photogenerating layer comprised of photogenerating pigments optionally dispersed in a resinous binder, and thereunder a hole transport layer comprised of aryl amine molecules dispersed in a mixture of resin binders, one of which is a liquid crystalline polymer.

Further, in yet another object of the present invention there are provided imaging and printing methods with the photoresponsive imaging members illustrated herein.

Also, in a further important object of the present invention there are provided imaging members sensitive to light in the visible region of the spectrum, that is, from about 400 to about 700 nanometers.

Moreover, in a further important object of the present invention there are provided improved imaging members with extended near infrared response to, for example, 800 nanometers, depending on the photogenerating pigment selected and improved white light response (panchromaticity).

Additionally, it is an object of this invention to provide improved imaging members where the cyclic stability thereof is extended with exellent image quality, high photosensitivity and low dark decay values.

Yet another specific object of the present invention resides in the minimization or avoidance of the crystallization of the charge transport molecules present in layered photoconductive imaging members.

Moreover, in a further important object of this invention there are provided imaging members with the liquid crystalline resin dispersed in the charge tranport layer, the primary function of such resins being to minimize or avoid charge transport molecule crystallization.

Additionally, in a further object of this invention there is provided the incorporation of a liquid crystalline resin dispersed in the charge transport layer, which minimizes or avoids charge transport molecule crystallization and maintains high photosensitivity, low dark decay values, and extended cyclic stability for the resulting photoconductive imaging member.

Yet another specific object of the present invention resides in the minimization or avoidance of the crystallization of charge transport molecules during solution spray coating process fabrication of the imaging member.

Furthermore, another specific object of the present invention resides in the minimization or avoidance of the crystallization of the charge transport molecules during the dip coating process fabrication of the imaging member.

Additionally, it is the object of this invention to provide an imaging member with high concentrations of the charge transport molecule, for example, up to and above 50 percent without defects due to crystallization.

Yet, one specific important object of this invention is to provide an imaging member fabricated by solution spray coating process whereby about 35 percent to about 50 percent or more charge transport molecules are employed with a liquid crystalline resin in the charge transport layer comprised of additional resins without defects or voids resulting from crystallization, and whereby high photosensitivity, low dark decay values and extended cyclic stability are obtained.

Similarly, in another specific object of this invention there is provided an imaging member fabricated by dip coating whereby from about 35 percent to about 50 percent or more, such as for example 75 percent by weight of charge transport molecules, are employed with a liquid crystalline resin in the charge transport layer comprised of additional resins without defects or voids resulting from crystallization and whereby high photosensitivity, low dark decay values and extended cyclic stability are obtained.

It is another object of this invention to provide an imaging member whereby the charge transport layer is comprised of from about 0.1 to about 75 percent, and more preferably from about 0.1 to about 20 percent of liquid crystalline resin, from about 1 to about 50, or more preferably from about 20 to about 55 percent charge transport molecule with the remainder being a resin binder selected from, for example, polyester, polycarbonate, polyamide, or mixtures thereof.

These and other objects of the present invention are accomplished by the provision of layered photoconductive imaging members, and more specifically imaging members comprised of hole transport molecules dispersed in a resin binder mixture. In one embodiment, the layered photoconductive imaging members of the present invention are comprised of photogenerating layers, and in contact therewith a charge or hole transport layer or layers with hole transport molecules dispersed in a resin binder mixture wherein one of the resins is a liquid crystalline polymer.

In a specific embodiment, the photoconductive layered imaging members of the present invention are comprised of, for example, a supporting substrate, a photogenerating layer comprised of inorganic photogenerating or organic photogenerating pigments optionally dispersed in a resin binder, and a charge or hole transport layer, especially an aryl amine, dispersed in a resin binder mixture wherein one of the resins is a liquid crystalline polymer as illustrated herein.

With further respect to the photoconductive imaging members of the present invention, the photogenerating layer can be situated between the supporting substrate and the hole transport layer; or alternatively, the hole transport layer may be situated between the supporting substrate and the photogenerating layer. These imaging members may also include protective overcoatings thereover including polymers such as polyurethanes, polycarbonates and the like with a thickness of from about 0.2 micron to about 10 microns, or other effective thicknesses.

In a specific illustrative embodiment, the photoconductive imaging member of the present invention is comprised of (1) a supporting substrate; (2) a hole blocking layer; (3) an optional adhesive interface layer; (4) a photogenerating layer; and (5) a charge transport layer, such as an aryl amine hole transport layer dispersed in a mixture of resin binders, one of which is comprised of a liquid crystalline polymer. The photoconductive imaging member of the present invention in another embodiment is comprised of a conductive supporting substrate, a hole blocking organo silane or siloxane or metal oxide layer in contact therewith, an adhesive layer, such as 49,000 polyester available from Goodyear Chemical, a photogenerating layer comprised of photogenerating or photoconductive inorganic or organic pigments optionally dispersed in a resin binder such as polyvinylcarbazole overcoated on the adhesive layer, and as a top layer a hole transport layer comprised, for example, of certain aryl amines dispersed in a resinous binder mixture comprised of from about 0.1 to about 20 weight percent, and preferably from about 1 to about 5 weight percent of a liquid crystalline polymer, and a second or plurality of resins such as polycarbonates present in an effective amount of, for example, from about 99.9 to about 80 weight percent, and preferably from about 95 to about 99 weight percent.

Specific examples of photogenerating pigments include selenium; selenium alloys, such as selenium arsenic, sellium tellurium, selenium tellurium arsenic, and the like; halogen doped with, for example, from about 200 to about 700 parts of halogen; vanadyl phthalocyanine; metal phthalocyanines, such as copper phthalocyanine; metal free phthalocyanines, such as x-metal free phthalocyanines; thionated perylenes including, for example, bisbenzimidazole thionated perylene isomers such as cis,syn-bisbenzimidazole thionated perylene, cis,antibisbenzimidazole thionated perylene, trans-bisbenzimidazole thionated perylene, bispropyl thionated perylene; bisbenzimidazole trithionated perylene isomers such as cis,anti-bisbenzimidazole trithionated perylene, cis,syn-bisbenzimidazole trithionated perylene, trans-bisbenzimidazole trithionated perylene, bispropyl trithionated perylene, and the like, reference, for example, U.S. Pat. No. 4,410,616; 4,415,639; 4,439,507; 4,471,041; 4,486,520; 4,508,803; 4,514,482; 4,552,822; 4,555,463; 4,565,760; 4,587,189 and 4,644,082, the disclosures of each of these patents being totally incorporated herein by reference in their entirety.

In a specific embodiment of the present invention, the photogenerating thionated perylenes are prepared from perylo[6,6a,6b,7-bcd]thiophene-3,4,9,10-tetracarboxylic dianhydride, and thieno[2,3,4,5-ikl] perylo[6,6a,6b,7-cde]-1,2-dithiin-4,5,9,10-tetracarboxylic dianhydride with adaptations of the syntheses described by V. I. Rogovik and coworkers in *Organicheskoi Khimii* 10, 1072 (1974), and *Organicheskoi Khimii* 22, 1050 (1986), the disclosures of which are totally incorporated herein by reference. The above compounds can be converted into the bisbenzimidazo thio derivatives, which were formed as a mixture of the isomers by treatment with orthophenylenediamine in refluxing N-methylpyrrolidone (NMP). The reaction speed can be increased by the use of catalysts such as zinc acetate and the like. The structures of the thionated perylene pigments were established by a combination of elemental analyses, high-resolution 1H nuclear magnetic resonance spectroscopy, infrared spectroscopy, mass spectrometry, and the like as indicated herein.

Various known processes can be selected, reference many of the U.S. patents mentioned herein, for the preparation of the photoconductive imaging members of the present invention, the process parameters in the order of coating of the layers being dependent on the member desired. Specifically, for example, in one method the photogenerating layer is deposited on a supporting substrate by vacuum sublimation, and subsequently the hole transport layer is deposited thereover by solution coating. In another process variant, the layered photoconductive device can be prepared by providing the conductive substrate containing the hole blocking layer and an optional adhesive layer, and applying thereto by solvent coating processes, laminating processes, or other methods, the photogenerating layer, and the charge transport layer comprised preferably of an aryl amine.

Also, in an embodiment of the present invention the organic photogenerating pigments selected may be purified prior to incorporation in the imaging members by fractional sublimation, which involves subjecting the pigment to a temperature of from about 290° to 650° C., whereby impurities and decomposition products more volatile than the desired components are separated at a temperature zone of below 290° C. There are thus obtained the desired purified components at a purity of at least about 95 percent at a temperature zone of from about 290° to 650° C. separated from the nonvolatile impurities. The sublimation apparatus used has been described by H. J. Wagner et al. in *Journal of Materials Science*, Vol. 17, pages 2781 to 2791, (1982), the disclosure of which is totally incorporated herein by reference.

The photoconductive imaging members of the present invention can be incorporated into numerous imaging processes and apparatuses inclusive of those well known in the art such as xerographic imaging and printing processes. Specifically, the imaging members of the present invention are useful in xerographic imaging processes wherein the photogenerating pigments absorb light of a wavelength of from about 400 nanometers to about 800 nanometers. In these processes, electrostatic latent images are initially formed on the imaging member, followed by development, and thereafter transferring and fixing the image to a suitable substrate.

BRIEF DESCRIPTION OF THE DRAWINGS

For a better understanding of the present invention and further features thereof, reference is made to the following detailed description of various preferred embodiments wherein FIGS. 1 to 18, and 21 to 23 represent examples of thermotropic liquid crystalline polymers that may be selected for the imaging members of the present invention, wherein the substituents, such as R, R', X, Y, Z, m, n and o, are as illustrated herein;

DESCRIPTION OF SPECIFIC EMBODIMENTS

Specific embodiments of the present invention will now be provided with reference to specific photoconductive imaging members, however, the invention is not intended to be limited to these members.

Figure 19:
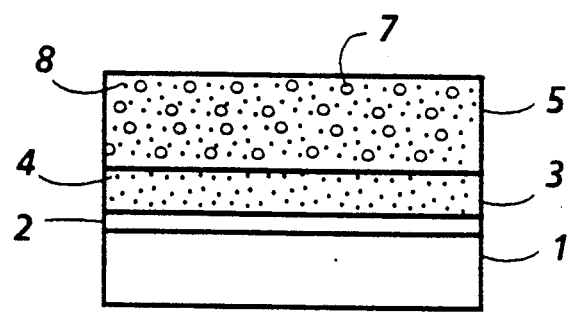
FIG. 19 is a partially schematic cross-sectional view of a photoresponsive imaging member of the present invention in which the photogeneration layer is situated between a substrate and a charge transport layer.

Illustrated in FIG. 19 is a photoresponsive imaging member of the present invention comprised of a supporting substrate 1, an adhesive layer 2, a photogenerator layer 3 comprised of inorganic or organic photogenerating or photoconductive pigments optionally dispersed in a resinous binder composition 4, which layer is preferably applied by vacuum deposition, and a charge carrier hole transport layer 5 comprised of an aryl amine, such as N,N'-diphenyl-N,N'-bis(3-methylphenyl)-[1,1'-biphenyl]-4,4'-diamine 7, dispersed in a resinous binder mixture 8 comprised of 5 weight percent of a liquid crystalline polymer and 95 weight percent of the polycarbonate Lexan available from General Electric.

Figure 20:
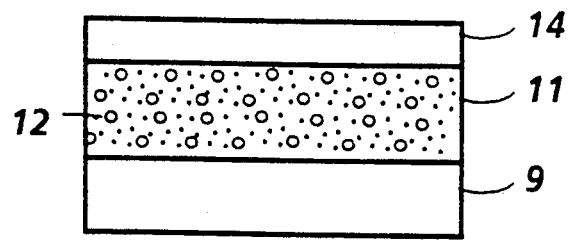
FIG. 20 is a partially schematic cross-sectional view of a photoresponsive imaging member of the present invention in which a charge transport layer is situated between the photogeneration layer and a substrate.

Illustrated in FIG. 20 is a photoresponsive imaging member in which the hole transport layer is situated between the supporting substrate and the photogenerating layer. More specifically, with reference to this Figure, there is illustrated a photoconductive imaging member comprised of a supporting substrate 9, a hole transport layer 11 comprised of the aryl amine hole transport composition dispersed in a resinous binder mixture 12 comprised of 5 weight percent of a liquid crystalline polymer and 95 weight percent of the polycarbonate Makrolon ® available from Bayer, and a photogenerating layer 14 comprised of an inorganic photoconductive component such as trigonal selenium, 99 weight percent, dispersed in the resin binder polyvinyl carbazole, 1 weight percent.

With further reference to the imaging members of the present invention, the substrates may comprise a layer of insulating material such as an inorganic or organic polymeric material, including Mylar a commercially available polymer; a layer of an organic or inorganic material having a semiconductive surface layer such as indium tin oxide or aluminum arranged thereon, or a conductive material such as, for example, aluminum, chromium, nickel, titanium, brass, or the like. The substrate may be flexible or rigid and many have a number of many different configurations, such as for example, a plate, a cylindrical drum, a scroll, an endless flexible belt, and the like. Preferably, the substrate is in the form of an endless flexible seamless belt. In some situations, it may be desirable to coat on the back of the substrate, particularly when the substrate is an organic polymeric material, an anticurl layer, such as for example, polycarbonate materials commercially available as Makrolon ® or Lexan ®. The thickness of the substrate layer depends on many factors, including economical considerations, thus this layer may be of substantial thickness, for example over 100 mils, or of minimum thickness providing there are no adverse effects on the member. In one preferred embodiment, the thickness of this layer is from about 3 mils to about 10 mils.

The optional adhesive layer is typically comprised of a polymeric material including polyesters, poly(vinyl butyral), poly(vinyl pyrrolidone), and the like. Typically, this layer is of a thickness of less than about 5 microns. The imaging member of the present invention can include other layers therein as illustrated hereinbefore, including metal oxide layers such as aluminum oxide and siloxanes, reference U.S. Pat. No. 4,464,450, the disclosure of which is totally incorporated herein by reference. Generally, the thickness of these layers is from about 0.5 to about 1 micron, however, other thicknesses can be selected providing the objectives of the present invention are achieved.

The photogenerating layer is generally of an effective thickness of, for example, from about 0.05 micron to about 10 microns, or more, and preferably is of a thickness of from about 0.1 micron to about 3 microns; however, the thickness of this layer is primarily dependent on the photogenerator weight loading which may vary from about 5 to 100 percent. Generally, it is desirable to provide this layer in a thickness which is sufficient to absorb about 90 percent or more of the incident radiation which is directed upon it, and the imagewise or printing exposure step. The maximum thickness of this layer is dependent primarily upon factors such as mechanical considerations, for example, whether a flexible photoconductive imaging member is desired, the thicknesses of the other layers, and the specific pyranthrone compound selected. Typical charge generating materials include metal free phthalocyanines, reference U.S. Pat. No. 3,357,989, the disclosure of which is totally incorporated herein by reference; metal phthalocyanines, such as copper phthalocyanine; quinacridones available from DuPont under the tradename Monastral Red, Monastral Violet and Monastral Red Y, substituted 2,4-diamino triazines as illustrated in U.S. Pat. No. 3,442,781, the disclosure of which is totally incorporated herein by reference; aromatic quinones, especially those available from Allied Chemical Corporation under the tradenames Indofast Double Scarlet, Indofast Violet Lake B, Indofast Brilliant Scarlet, and Indofast Orange; the charge generating layers as illustrated in U.S. Pat. Nos. 4,265,990; 4,233,384; 4,471,041; 4,489,143; 4,507,480; 4,306,008; 4,299,897; 4,232,102; 4,233,383; 4,415,639 and 4,439,507, the disclosures of each of the aforementioned patents being totally incorporated herein by reference, and the like. Optional resin binders for the photogenerating layer include polycarbonates, acrylate polymers, vinyl polymers, cellulose polymers, polyesters, polysiloxanes, polyamides, polyurethanes, epoxies, and the like, including the organic resinous binders as illustrated in U.S. Pat. Nos. 3,121,006 and 4,439,507, the disclosures of which are totally incorporated herein by reference. Generally, the photogenerating layers are present in an effective amount in the resinous binder such as, for example, a polyvinylcarbazole or a poly(hydroxy ether), and more specifically from about 5 percent by weight of volume to about 60 percent by weight of volume, and in a preferred embodiment of from about 40 percent by volume to about 95 percent by volume of the resinous binder with the remainder being the photogenerating pigment. The thickness of the photogenerating layers is as indicated herein and it is not particularly critical providing that the layer is of an effective thickness. Thicknesses of from about 0.05 micrometer to about 40 micrometers are satisfactory, however, other thicknesses may be selected, including in an embodiment thicknesses of from about 0.1 micrometer to about 5.0 micrometers with an optimum thickness in an embodiment of the present invention being from about 0.3 micrometer to about 3.0 micrometers. Other photoconductive layers include amorphous selenium, amorphous selenium alloys such as selenium arsenic, preferably with selenium being present in an amount of from about 90 to about 99.9 percent by weight, selenium tellurium arsenic, selenium tellurium, and the like.

Various suitable hole transport layers, and preferably aryl amine hole transport layers, are selected for the photoconductive imaging members of the present invention, which layer has a thickness, for example, of from about 5 microns to about 75 microns, and preferably is of a thickness of from about 10 microns to about 40 microns. In a preferred embodiment, this transport layer comprises aryl amine molecules of the following formula

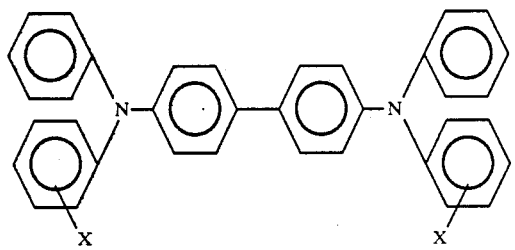

dispersed in a resin binder mixture as illustrated herein, wherein X is selected from the group consisting of alkyl and halogen, and preferably (ortho)$CH_3$, (meta)$CH_3$, (para)$CH_3$, (ortho)Cl, (meta)Cl, or (para)Cl.

Aryl amines corresponding to the above formula include, for example, N,N'-diphenyl-N,N'-bis(alkylphenyl)-[1,1-biphenyl]-4,4'-diamine wherein alkyl is selected from the group consisting of methyl such as 2-methyl, 3-methyl, and 4-methyl, ethyl, propyl, butyl, hexyl, and the like. With halo substitution, the amine is N,N'-diphenyl-N,N'-bis(halo phenyl)-[1,1'-biphenyl]-4,4'-diamine wherein halo is 2-chloro, 3-chloro, or 4-chloro.

Examples of the highly insulating and transparent resinous material or inactive binder resinous material for the photogenerating or transport layers include materials such as those described in U.S. Pat. No. 3,121,006, the disclosure of which is totally incorporated herein by reference. Specific examples of organic resinous materials selected as one component of the mixture binder, especially for the transport layer, include polycarbonates, acrylate polymers, vinyl polymers, cellulose polymers, polyester, polysiloxanes, polyamides, polyurethanes and epoxies as well as block, random or alternating copolymers thereof. Preferred electrically inactive first binder materials for the charge transport are polycarbonate resins having a molecular weight ($M_w$) of from about 20,000 to about 100,000 with a molecular weight in the range of from about 50,000 to about 100,000 being particularly preferred. Generally, the resinous binder contains from about 10 to about 75 percent by weight of the charge transport material corresponding to the foregoing formula, and preferably from about 35 percent to about 50 percent of this material. With further reference to the resinous binder for the charge transport molecules, there may be selected any suitable inactive resinous binder soluble, for example, in halogenated halides such as methylene chloride or other suitable solvent including polycarbonate resins, polyvinylcarbazole, polyesters, polyacrylates, polyarylate, polyether, polysulfone, and the like with weight average molecular weights preferably being from about 20,000 to about 1,500,000. The preferred resinous binder is the polycarbonates mentioned herein with a weight average molecular weight of from about 20 to about 100,000 and preferably from about 50 to about 100,000. Also, as the electrically inactive resinous binder there can be specifically selected poly(4,4'-dipropyl-diphenylene carbonate), preferably with a weight average molecular weight of from about 35,000 to about 40,000, available as Lexan 145 from General Electric Company; poly(4,4'-isopropyldenediphenyl carbonate) with a molecular weight of from about 40,000 to about 45,000 available as Lexan 141 from the General Electric Company; a polycarbonate resin available as Makrolon ® from Farbenfabricken AG with a weight average molecular weight of from about 50,000 to about 100,000; and a polycarbonate available as Merlon from Mobay Chemical Company with a preferred weight average molecular weight of from about 20,000 to about 500,000. Mixtures of the aforementioned resinous binders can be selected, which mixtures contain an effective amount of two resins or a plurality of resins up to, for example, 10 resins in some embodiments of the present invention. Polyvinyl carbazole can be considered a preferred binder for the photogenerator pigment in an embodiment of the present invention.

For the charge transport layer the resin binder also includes liquid crystalline polymers as illustrated herein that function primarily, it is believed, to prevent or minimize crystallization of the hole transport molecules.

Figure 1:
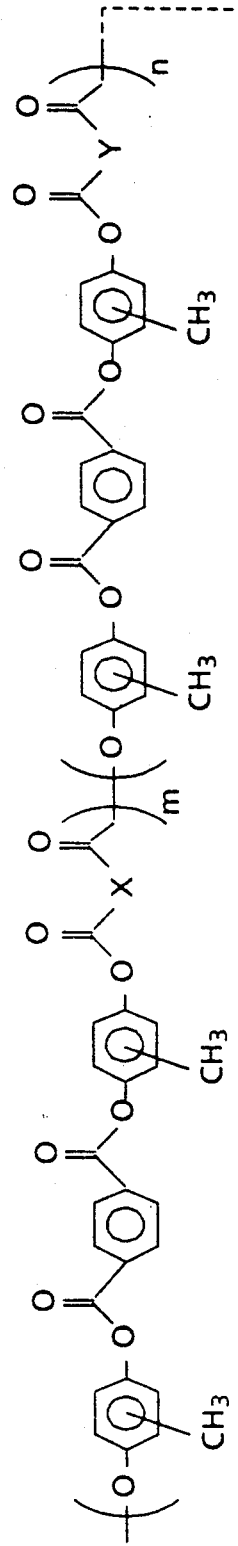
Figure 1:
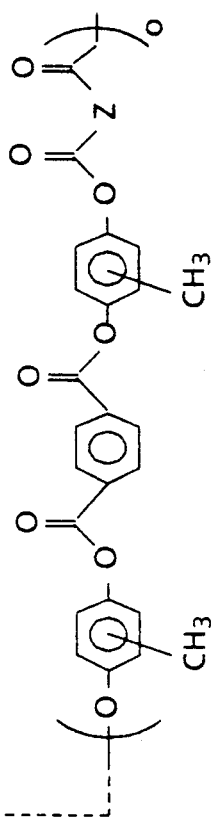
Figure 2:
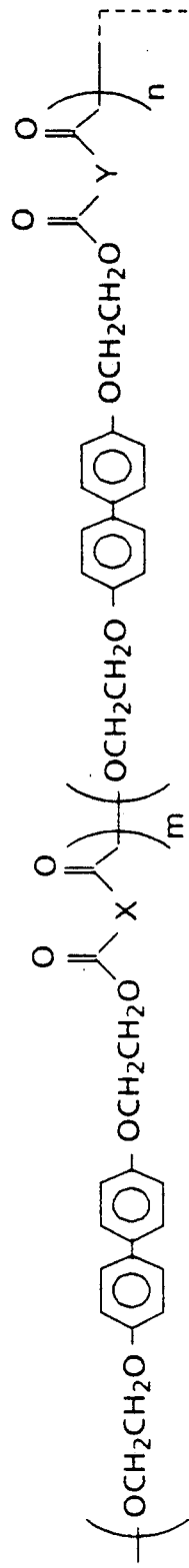
Figure 2:
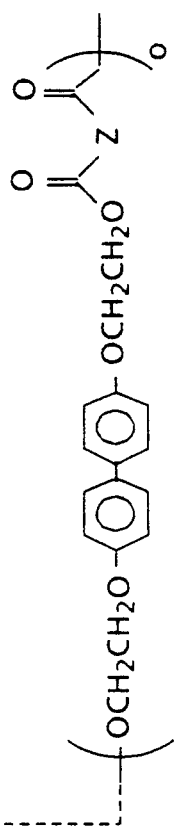
Figure 3:
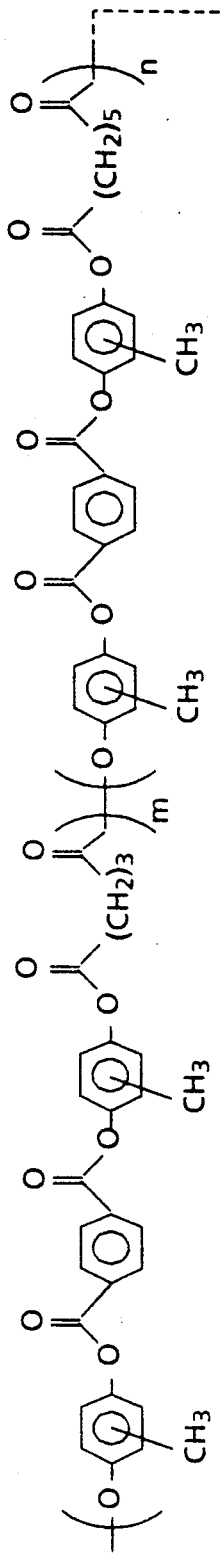
Figure 3:
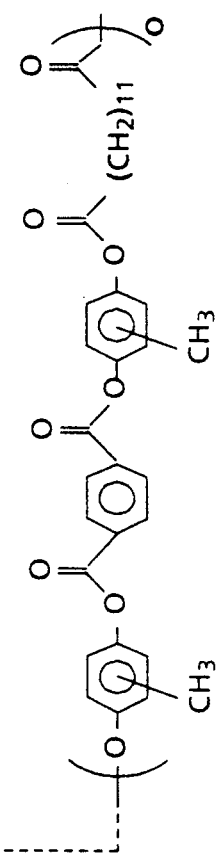

Specific examples of liquid crystalline polymers selected include those as illustated in U.S. Pat. No. 4,543,313, U.S. Pat. No. 4,891,293 and U.S. Pat. No. 4,973,539, the disclosures of the aforementioned patents being totally incorporated herein by reference in their entirety. More specifically, the random liquid crystalline copolyesters selected can include three spacer groups and are of the formulas as illustrated in FIGS. 1 and 2, of the aforementioned copending application U.S. Pat. No. 4,891,293 wherein x, y, and z are independently selected from alkyl, alkylene, substituted alkyl, and substituted alkylene, subject to the provision in a preferred embodiment that x, y, and z represent different groups; and m, n, and o represent the number of monomer segments present in the copolymer.

Alkyl and alkylene groups include those with from 1 to about 25 carbon atoms such as methyl, methylene, ethyl, ethylene, propyl, propylene, butyl, butylene, pentyl, pentylene, and the like. Examples of substituents present on the alkyl or alkylene groups include, for example, alkyl as illustrated herein, such as methyl, ethyl, propyl, butyl, hexyl, lauryl, and the like; alkoxy and arylalkoxy such as methoxy, ethoxy, propoxy, butoxy, pentoxy, octaoxy, brassiloxy, and phenoxy; nitro; halogen including fluorine, bromine, iodine, and chlorine; cyano; hydroxyl; and the like. Alkoxy groups as utilized herein thus include those components with from about 1 to about 25 carbon atoms. Aryl includes those components with from about 6 to about 24 carbon atoms such as phenyl. Also, the sum of m, n, and o is equal to about 100 percent, thus m can be from about 1 to about 99 percent, n can be from about 1 to about 99 percent, and o can be from about 1 to about 99 percent. Preferably, the values of m, n, and o are about 33 percent. Also, specific examples of liquid crystalline random copolymers are also illustrated in FIGS. 3 to 16 of U.S. Pat. No. 4,891,293, whereby m, n, and o represent the number of monomer units and R is as defined herein. Generally, the weight average molecular weight of the thermotropic liquid crystalline polymers of the aforementioned copending applications and patent are from about 3,000 to about 50,000, and preferably from about 5,000 to about 35,000 in an embodiment thereof.

Figure 21:
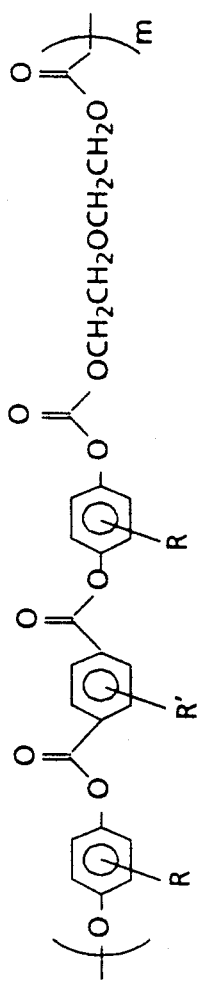
Figure 22:
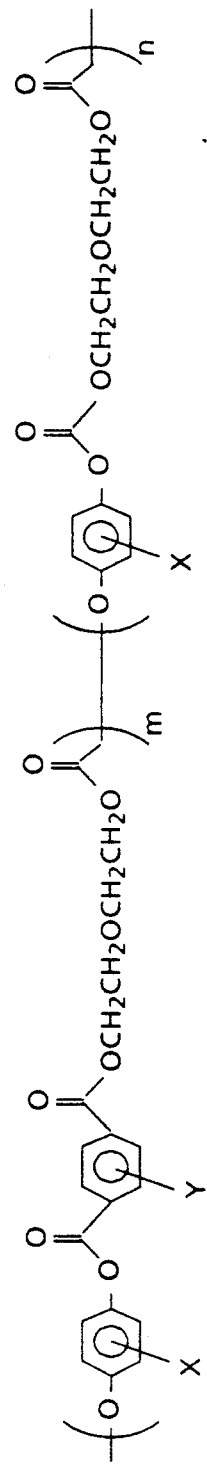

The random thermotropic liquid crystalline copolymers of the copending applications are prepared as illustrated therein. Specifically, for example, those represented by FIG. 16 are generally prepared by the copolymerization of an appropriate aromatic component such as p,p-di(alkylaryloxy)-tetraphthalate with three different aliphatic diacid halides, such as malonyl chloride, succinyl chloride, adipoyl chloride, 3-methyladipoyl chloride pimeloyl chloride, glutaryl chloride, sebacoyl chloride, brassiloyl chloride, the corresponding bromides, fluorides, iodides, and the like, in the presence of an acid acceptor such as pyridine or triethylamine, and a halogenated solvent such as dichloromethane. The random liquid crystalline copolymers represented by FIG. 21 are generally prepared by the copolymerization of an appropriate aromatic component such as p,p-di-(alkylaryloxy)-tetraphthalate and a dialkylene glycol bischloroformate such as diethylene glycol bischloroformate, or bischloroformates of other glycols such as ethylene, propylene, butylene, pentylene, hexylene, triethylene, tetraethylene heptylene, octylene and mixtures thereof and the like, in the presence of an acid acceptor such as pyridine or triethylamine, and a halogenated solvent such as dichloromethane. The random thermotropic liquid crystalline copolymers represented by FIG. 22 are generally prepared by the copolymerization of an appropriate aromatic diacid halide such as terephthaloyl chloride, an aromatic diphenol such as hydroquinone, methylhydroquinone, chlorohydroquinone, with one or more aliphatic diacid halides, such as malonyl chloride, succinyl chloride, adipoyl chloride, 3-methyladipoyl chloride pimeloyl chloride, glutaryl chloride, sebacoyl chloride, brassiloyl chloride, the corresponding bromides, fluorides, iodides, and the like, and an alkylene glycol bischloroformate such as diethylene glycol bischloroformate or bischloroformates of other glycols such as ethylene, propylene, butylene, pentylene, hexylene, triethylene, tetraethylene heptylene, octylene and mixtures thereof, and the like, in the presence of an acid acceptor such as pyridine or triethylamine, and a halogenated solvent such as dichloromethane. Generally, the reaction for the preparation of the aforementioned liquid crystalline copolymers is accomplished at a temperature of from about 10° C. to about 50° C. and preferably from about 15° C. In one specific embodiment, the copolyesters as represented by FIG. 1 of the aforementioned copending application can be prepared by reacting from about 0.8 mole to about 1 mole of p,p-di-(methylphenoxy)-terephthalate preferably containing at least from 1 to about 3 different spacers such as adipoyl chloride, and the like as indicated herein at a temperature of about 15 to about 25° C. This reaction is generally affected in the presence of from about 1 mole to about 3 moles of an acid acceptor such as triethylamine or pyridine, and the like, and an excess amount, that is an amount sufficient to dissolve the reactants of organic solvents, such as aliphatic halogenated hydrocarbons including methylene chloride. Thereafter, the resulting product is separated from the reaction mixture by known techniques such as extraction, precipitation, followed by filtration, optionally washed, and identified by various analytical tools including elemental analysis, NMR, IR and UV. Accordingly, the polymers as represented by FIGS. 1 to 16 of the aforementioned copending application can be prepared by the aforementioned solution condensation processes, or by interfacial or melt condensation processes. In addition, the polymer products resulting possess intrinsic viscosities of from about 0.06 to about 0.75, and preferably from about 0.1 to about 0.55 deciliters per gram (dl/g).

Figure 11:
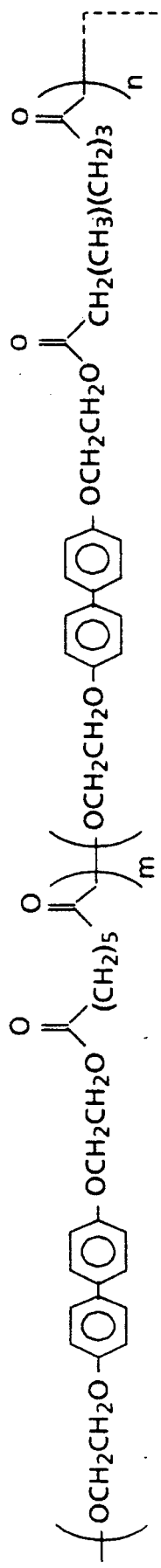
Figure 11:
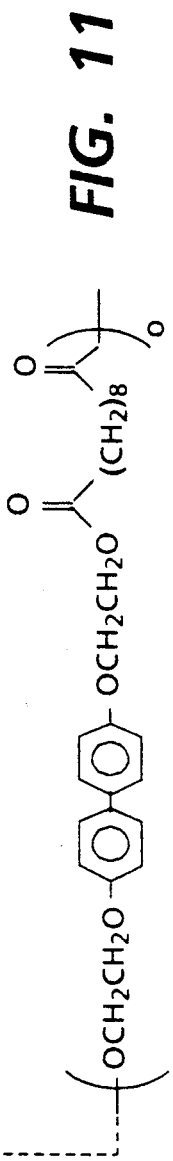
Figure 12:
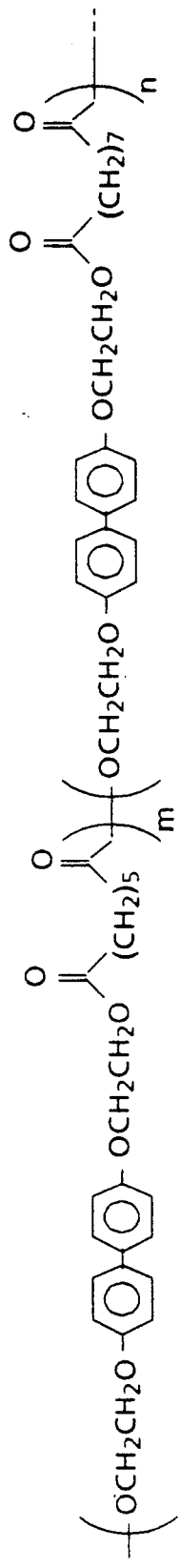
Figure 13:
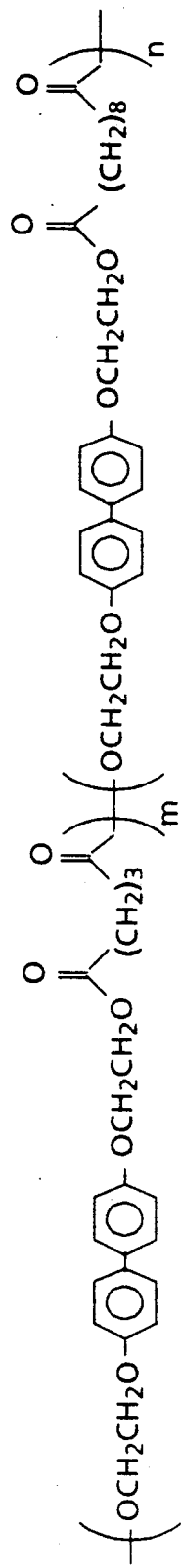
Figure 14:
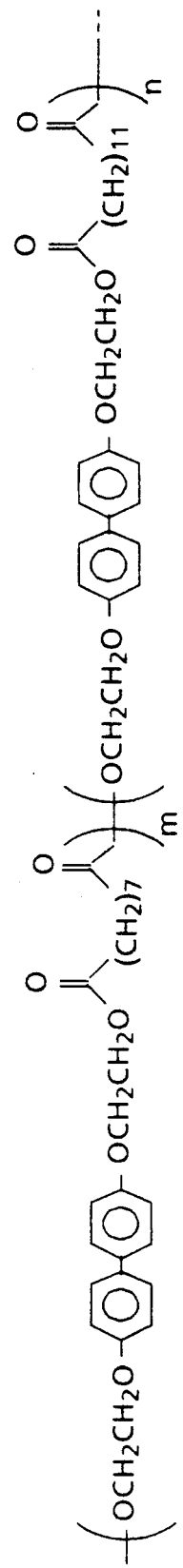
Figure 17:
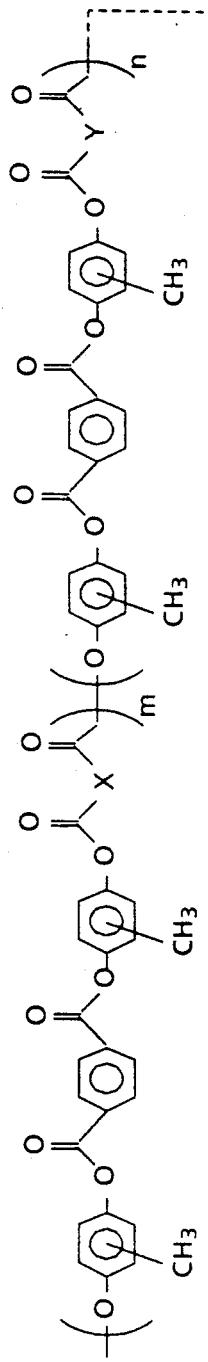
Figure 18:
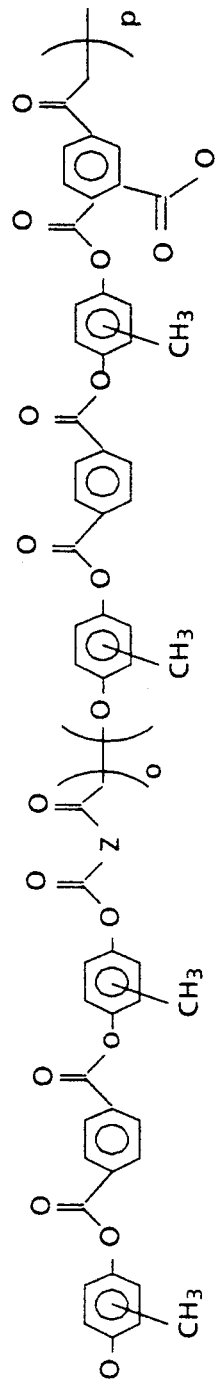
Figure 18:
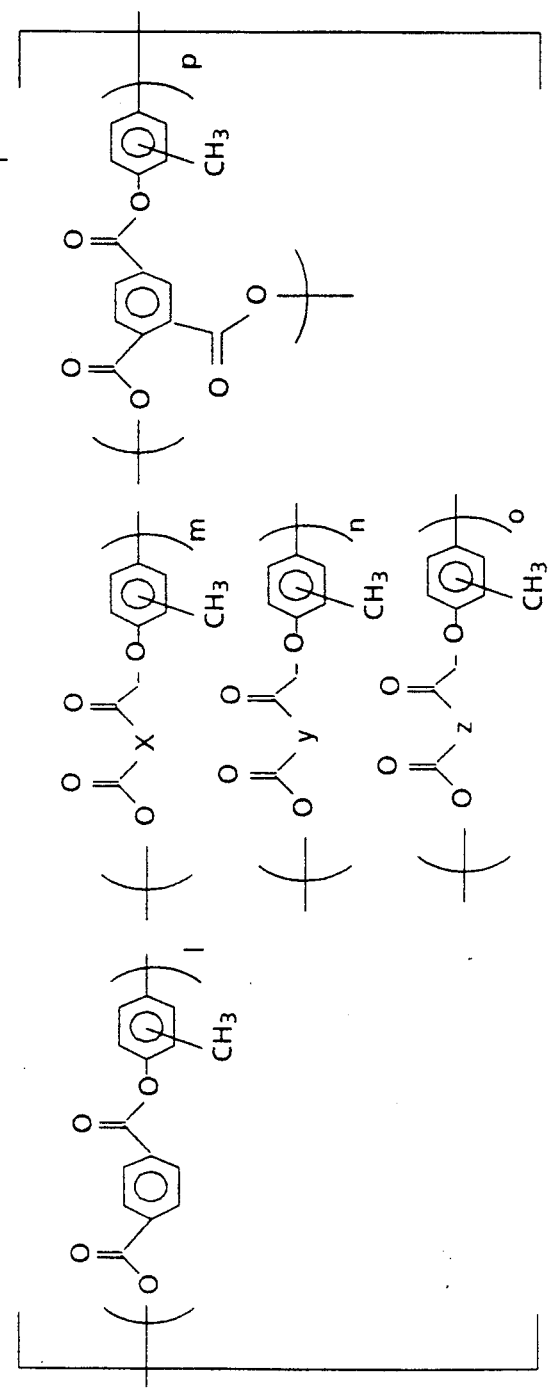

The liquid crystalline copolyester resin illustrated in FIG. 11 can be prepared by condensation of a mesogenic-spacer moiety such as diethanol-biphenyl moiety with one or more spacers selected from the group of diacid halides such as malonyl chloride, succinyl chloride, adipoyl chloride, 3-methyladipoyl chloride pimeloyl chloride, glutaryl chloride, sebacoyl chloride, brassiloyl chloride, the corresponding bromides, fluorides, iodides, and the like, in the presence of an acid acceptor such as pyridine or triethylamine and a halogenated solvent such as dichloromethane.

Figure 23:
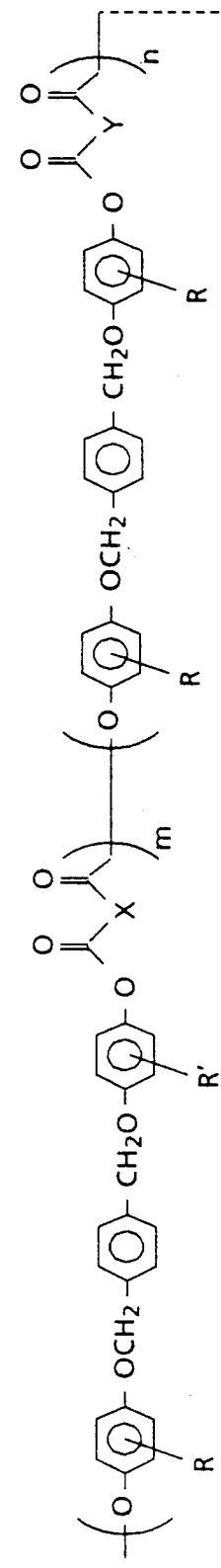

The thermotropic liquid crystalline resin of FIG. 23 can be prepared by the condensation of $\alpha,\alpha$-dibromo-p-xylene and the dipotassium salt of methylhydroquinone to give the flexible spacer bis(methylhydroquino)-$\alpha,\alpha$-p-xylene followed by condensation with one or more spacers selected from the group of diacid halides such as malonyl chloride, succinyl chloride, adipoyl chloride, 3-methyladipoyl chloride pimeloyl chloride, glutaryl chloride, sebacoyl chloride, brassiloyl chloride, the corresponding bromides, fluorides, iodides, and the like, in the presence of an acid acceptor such as pyridine or triethylamine and a halogenated solvent such as dichloromethane. Other thermotropic liquid crystalline components can be prepared as illustrated in the copending application mentioned herein and, for example, U.S. Pat. No. 4,543,313.

Other examples of liquid crystalline polymers are illustrated in the *ENCYCLOPEDIA OF POLYMER SCIENCE AND ENGINEERING*, volume 9 (1985), pages 1 to 61, authored by S. L. Kwolek, P. W. Morgan, J. R. Schaefgen and published by John Wiley and Sons, the disclosure of which is wholly incorporated herein by reference. The liquid crystalline resins of the aforementioned reference include liquid crystalline polycarbonates, polyester, polyamides, and polyethers obtained by the careful selection of wholly symmetrical aromatic moieties or by the careful selection of a mesogenic unit(s) such as para-substituted aromatic moieties, cyclic aliphatic moieties, kinking agents such as bisphenols, substituted bisphenols, ortho or meta-substituted aromatic or unsymmetrical aliphatic rings, and spacers such as aliphatic glycols, aliphatic diesters, aliphatic diamides, siloxanes, mixtures thereof and the like.

The aforementioned liquid crystalline polymers, within which the hole transport molecules, particularly the aryl amines, are dispersed, are present in an effective amount to achieve the main object of the present invention, that is to prevent and/or minimize crystallization of the charge transport molecules. In an embodiment, the amount of liquid crystalline resin selected is from about 1 to about 20 weight percent, and preferably from about 5 to about 10 weight percent. Other effective amounts not specifically mentioned may be selected.

Also included within the scope of the present invention are methods of imaging with the photoresponsive devices illustrated herein. These methods generally involve the formation of an electrostatic latent image on the imaging member; followed by developing the image with known developer compositions, reference for example U.S. Pat. Nos. 3,590,000; 4,469,770; 4,560,635 and 4,298,672, the disclosures of which are totally incorporated herein by reference; subsequently transferring the image to a suitable substrate; and permanently affixing the image thereto.

The following examples are being supplied to further define the present invention, it being noted that these examples are intended to illustrate and not limit the scope of the present invention. Parts and percentages are by weight unless otherwise indicated.

EXAMPLE I

To a mixture of p,p-di(methylphenoxy)-terephthalate (0.1 mole), pyridine (0.3 mole) and dichloromethane was added dropwise with a syringe pump a mixture of 3-methyladipoyl dichloride (0.0333 mole), pimeloyl dichloride (0.0333 mole), and sebacoyl dichloride (0.0333 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained, as evidenced by nuclear magnetic resonance and infrared spectroscopy, the random thermotropic liquid copolyester product as illustrated in FIG. 16, where m, n, and o represent repeating segments and are about 33.33 percent each, R is a methyl substituent, R' is a hydrogen moiety, X is a 3-methylbutyl spacer, Y is a pentyl spacer and Z is an octyl spacer.

The DSC thermogram of this polymer indicated a glass transition of about 40° C. to about 42° C., a melting point transition from the crystalline solid state to the liquid crystalline of from about 60° C. to about 75° C., and a clearing point transition from the liquid crystalline state to the isotropic melt of about 330° C. The weight average molecular weight of the polymer product was 5,000 as determined by GPC.

EXAMPLE II

To a mixture of p,p-di(methylphenoxy)-terephthalate (0.1 mole), pyridine (0.3 mole) and dichloromethane there was added dropwise diethyleneglycol-bischloroformate (0.1 mole) using a syringe pump. The mixture was then left undisturbed overnight, about 16 hours, and then neutralized with dilute aqueous HCl. The resulting organic portion was then separated, washed with water followed by brine, and then precipitated in methanol. The copolymer product was then filtered off and dried to provide a yield in excess of 95 percent. There was obtained, as evidenced by nuclear magnetic resonance and infrared spectroscopy, the thermotropic copolymer product as illustrated in FIG. 21, where R is a methyl substituent, and R' is a hydrogen moiety.

The DSC thermogram of this polymer indicated a melting point transition from the crystalline solid state to the liquid crystalline of from about 45° C. to about 65° C., and a clearing point transition from the liquid crystalline state to the isotropic melt about 300° C. The weight average molecular weight of the polymer product was 9,000 as determined by GPC.

EXAMPLE III

To a mixture of methylhydroquinone (0.1 mole), pyridine (0.3 mole) and dichloromethane was added dropwise with a syringe pump a mixture of diethylene glycol bischloroformate (0.05 mole), and terephthaloyl dichloride (0.05 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained, as evidenced by nuclear magnetic resonance and infrared spectroscopy, the random thermotropic copolyester product as illustrated in FIG. 22, where X represents a methyl group, Y represents a hydrogen atom, and where m and n represent repeating segments and are about 50 percent each.

The DSC thermogram of this polymer indicated a melting point transition from the crystalline solid state to the liquid crystalline of from about 55° C. to about 75° C., and a clearing point transition from the liquid crystalline state to the isotropic melt above 300° C. The polymer product was 5,000 as determined by GPC.

EXAMPLE IV

To a mixture of methylhydroquinone (0.1 mole), pyridine (0.3 mole) and dichloromethane was added dropwise with a syringe pump a mixture of diethylene glycol bischloroformate (0.05 mole) and nitroterephthaloyl dichloride (0.05 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained, as evidenced by nuclear magnetic resonance and infrared spectroscopy, the random thermotropic copolyester product as illustrated in FIG. 11, where m, n, and o represent repeating segments and are about 33.33 percent each, X is a 3-methylbutyl spacer, Y is a pentyl spacer and Z is an octyl spacer.

The DSC thermogram of this polymer indicated a melting point transition from the crystalline solid state to the liquid crystalline of from about 65° C. to about 85° C., and a clearing point transition from the liquid crystalline state to the isotropic melt above 300° C. The weight average molecular weight of the polymer product was 5,000 as determined by GPC.

EXAMPLE V

To a mixture of α,α-dibromo-p-xylene (0.1 mole), tetrahydrofuran (100 milliliters) were added catalytic amounts of tetrabutylammonium iodide and a dropwise addition of the potassium salt of methylhydroquinone (0.2 mole), followed by heating to 65° C. for 3 hours. The mixture was then cooled and to this were added dropwise with a syringe pump a mixture of 3-methyladipoyl dichloride (0.0333 mole), pimeloyl dichloride (0.0333 mole), and sebacoyl dichloride (0.0333 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained, as evidenced by nuclear magnetic resonance and infrared spectroscopy, the random copolyester product as illustrated in FIG. 23, where m,n, and o represent repeating segments and are about 33.33 percent each, R is a methyl substituent, R' is a hydrogen moiety, X is a 3-methylbutyl spacer, Y is a pentyl spacer and Z is an octyl spacer.

The DSC thermogram of this polymer indicated a melting point transition from the crystalline solid state to the liquid crystalline of from about 45° C. to about 55° C., and a clearing point transition from the liquid crystalline state to the isotropic melt above 125° C.. The weight average molecular weight of the polymer product was 7,500 as determined by GPC.

EXAMPLE VI

A film was cast from methylene chloride containing 10 percent weight solids containing 5 percent weight of the liquid crystalline polymer obtained from Example II, 50 percent weight of N,N'-diphenyl-N,N'-bis(3-methylphenyl) 1,1'-biphenyl-4,4'-diamine and 45 percent weight of bisphenol A polycarbonate (Makrolon ®). This film was annealed in in a forced air oven at 140° C. for two hours and the crystallinity of N,N'-diphenyl-N,N'-bis(3-methylphenyl) 1,1'-biphenyl-4,4'-diamine in the annealed film was measured by scanning differential calorimetry. The measured degree of crystallinity of N,N'-diphenyl-N,N'-bis(3-methylphenyl) 1,1'-biphenyl-4,4'-diamine was 5 percent weight compared with 30 percent weight for a film containing no liquid crystalline polymer and treated in an identical manner.

EXAMPLE VII

A film was cast from methylene chloride containing 10 percent weight solids containing 5 percent weight of the liquid crystalline polymer obtained from Example II, 40 percent-weight of N,N'-diphenyl-N,N'-bis(3-methylphenyl) 1,1'-biphenyl-4,4'-diamine and 55 percent weight bisphenol A polycarbonate (Makrolon ®). This film was annealed in a forced air oven at 140° C. for two hours and the crystallinity of N,N'-diphenyl-N,N'-bis(3-methylphenyl) 1,1'-biphenyl-4,4'-diamine in the annealed film was measured by scanning differential calorimetry. The N,N'-diphenyl-N,N'-bis(3-methylphenyl) 1,1'-biphenyl-4,4'-diamine was not observed to have crystallized compared with an observed crystallinity of 4 percent weight for a film containing no liquid crystalline polymer and treated in an identical manner.

EXAMPLE VIII

A film was cast from methylene chloride containing 10 percent weight solids containing 5 percent weight of PE200, an amorphous polyester, 40 percent weight of N,N'-diphenyl-N,N'-bis(3-methylphenyl) 1,1'-biphenyl-4,4'-diamine and 55 percent weight of bisphenol A polycarbonate (Makrolon ®). This film was annealed in a forced air oven at 140° C. for two hours and the crystallinity of N,N'-diphenyl-N,N'-bis(3-methylphenyl) 1,1'-biphenyl-4,4'-diamine in the annealed film was measured by scanning differential calorimetry. The measured degree of crystallinity of N,N'-diphenyl-N,N'-bis(3-methylphenyl) 1,1'-biphenyl-4,4'-diamine was 5 percent weight compared with 4 percent weight for a film composed of 40 percent weight of N,N'-diphenyl-N,N'-bis(3-methylphenyl)1,1'-biphenyl-4,4'-diamine and 60 percent weight bisphenol A polycarbonate (Makrolon ®) and treated in an identical manner.

EXAMPLE IX

A layered photoconductive imaging member comprised of a resin binder blend of polycarbonate with a liquid crystalline polymer for the charge transport layer matrix and a trigonal selenium photogenerator was prepared as follows:

A dispersion of trigonal selenium and poly(N-vinylcarbazole) was prepared by ball milling 1.6 grams of trigonal selenium and 1.6 grams of poly(N-vinylcarbazole) in 14 milliliters each of tetrahydrofuran and toluene. Ten grams of the resulting slurry was then diluted with a solution of 0.25 gram of N-N'-diphenyl-N,N'-bis(3-methylphenyl)-[1,1'-biphenyl]-4.4'-diamine in 5 milliliters each of tetrahydrofuran and toluene. A 1.5 microns thick photogenerator layer was fabricated by coating the above dispersion onto an aluminized Mylar substrate, thickness of 2 mils, with a multiple-clearance film applicator, followed by drying the resulting member in a applicator, followed by drying the resulting member in a forced air oven at 135° C. for 5 minutes. A solution for the hole transport layer was then prepared by dissolving 1.0 gram of charge transport molecule N-N'-diphenyl-N-N'-bis(3-methylphenyl)-[1,1'-biphenyl]-4,4'-diamine with 0.9 gram of polycarbonate and 0.1 gram of liquid crystalline polymer of Example II in 10 milliliters of methylene chloride. This solution was then coated over the photogenerator layer by means of a Bird film applicator. The resulting member was then dried in a forced air oven at 130° C. for 30 minutes resulting in an 24 micron thick transport layer.

The fabricated imaging member was then electrically tested by negatively charging it with a corona, and discharged by exposing to white light of wavelengths of from 400 to 700 nanometers. Charging was accomplished with a single wire corotron in which the wire was contained in a grounded aluminum channel and was strung between two insulating blocks. The acceptance potential of this imaging member after charging and its residual potential after exposure was recorded. The procedure was repeated for different exposure energies supplied by a 75 watt Xenon arc lamp of incident radiation and the exposure energy required to discharge the surface potential of the member to half of its original value was determined. This surface potential was measured using a wire loop probe contained in a shielded cylinder, and placed directly above the photoreceptor member surface. This loop was capacitively coupled to the photoreceptor surface so that the voltage of the wire loop corresponded to the surface potential. Also, the cylinder enclosing the wire loop was connected to the ground.

For this imaging member, the acceptance potential was 900 volts, the dark decay was 30 volts/second, and the residual potential was 10 volts. Further, the electrical properties of this photoreceptor member remained essentially unchanged for 200,000 cycles of repeated charging and discharging, and no crystallization of the hole transport molecules was observed.

EXAMPLE X

A layered photoconductive imaging member with a transport layer comprised of N-N'-diphenyl-N-N'-bis(3-methylphenyl)-[1,1'-biphenyl]-4,4'-diamine molecularly dispersed in a blend of polycarbonate with the liquid crystalline polymer of Example II and an amorphous selenium photogenerating layer was fabricated as follows:

A 0.5 micron thick layer of amorphous selenium on a ball grained aluminum plate of a thickness of 7 mils was prepared by conventional vacuum deposition techniques. Vacuum deposition was accomplished at a vacuum of $10^{-6}$ Torr, while the substrate was maintained at about 50° C. A hole transport layer on top of the amorphous selenium layer was obtained by coating a solution of 0.8 gram of N,N'-diphenyl-N,N'-bis(3-methylphenyl) 1,1'-biphenyl-4,4'-diamine dissolved in a blend of 1.0 gram of polycarbonate and 0.2 gram of the liquid crystalline polymer of Example II in 10 milliliters of methylene chloride. Thereafter, the resulting device was dried in a forced air oven at 40° C. for 1 hour to form an 18 micron thick transport layer. Subsequently, the imaging member was cooled to room temperature, followed by electrical testing in accordance with the procedure of Example IX except that a 450 nanometer monochromatic light was used for irradiation. Specifically, this imaging member was negatively charged to 800 volts and discharged to a residual potential of 30 volts. The dark decay was 10 volts/second. Further, the electrical properties of the above prepared layered photoconductor member remained essentially unchanged for 1,000 cycles of repeated charging and discharging, and no crystallization of the aforementioned hole transport aryl amine molecules was observed.

EXAMPLE XI

A photoresponsive device comprised of a transport layer of polycarbonate blended with the liquid crystalline polymer of Example II doped with a transport molecule, and squarylium pigments as the photogenerator was prepared as follows:

A ball grained aluminum substrate, 7 mils in thickness, was coated with a solution of 1 milliliter of 3-aminopropyltrimethoxysilane in 100 milliliters of ethanol. The coating was heated at 110° C. for 10 minutes resulting in the formation of a 0.1 micron thick polysilane layer. A dispersion of a photogenerator prepared by ball milling a mixture of 0.075 gram of bis(N,N'-dimethylaminophenyl)squaraine and 0.13 gram of Vitel PE-200 polyester (available from Goodyear) in 12 milliliters of methylene chloride for 24 hours was then coated on top of the polysilane layer. After drying the coating in a forced air oven at 135° C. for 6 minutes, a 0.5 micron thick squarylium photogenerating layer was obtained.

The transport layer was prepared in accordance with the procedure of Example XI. The resulting device was dried in a forced air oven at 135° C. for 30 minutes resulting in a 20 micron thick hole transport layer.

Electrical testing was affected in accordance with the procedure of Example IX. Specifically, the above prepared photoconductive imaging member was charged negatively to 1,000 volts and discharged with an 830 nanometer monochromatic light. For this imaging device, the dark decay was 35 volts/second, the residual potential was 25 volts, and substantially similar results were obtained as those of Example X with regard to the crystallization of the hole transport aryl amine molecules.

Other modifications of the present invention may occur to those skilled in the art subsequent to a review of the present application, and these modifications are intended to be included within the scope of the present invention.

What is claimed is:

1. A photoresponsive imaging member comprised of a photogenerating layer, and a charge transport layer comprised of aryl amine hole transport molecules dispersed in a resin binder mixture wherein at least one resin is a liquid crystalline thermotropic polymer.

2. An imaging member in accordance with claim 1 wherein the resin mixture is comprised of a polycarbonate and a liquid crystalline thermotropic polymer.

3. An imaging member in accordance with claim 1 wherein the polymer is selected from the group consisting of a liquid crystalline polyester, a liquid crystalline copolyester, a liquid crystalline polyamide, a liquid crystalline polycarbonate, a liquid crystalline copolycarbonate, a liquid crystalline polyurea, a liquid crystalline polyurethane, a liquid crystalline polyether, and a liquid crystalline copoly-(ester)-copoly-(carbonate).

4. An imaging member in accordance with claim 1 wherein the thermotropic liquid crystalline polymer is represented by the forumulas of FIGS. 1, 2, 3, 4, 5, 6, 7, 8, 9, 10, 11, 12, 13, 14, 15 or 16 wherein X, Y and Z are independently selected from the group consisting of alkyl, alkylene, substituted alkyl, substituted alkylene; R and R' are independently selected from the group consisting of hydrogen, hydroxyl, halogen, nitro, alkoxy, arylalkoxy and alkyl; and m, n and o represent the number of monomer segments.

5. An imaging member in accordance with claim 4 wherein alkyl and alkylene contain from 1 to about 25 carbon atoms.

6. An imaging member in accordance with claim 4 wherein the sum of m, n, and o is equal to 100 percent.

7. An imaging member in accordance with claim 4 wherein R is a methyl group, R' is hydrogen, X is 3-methylbutyl, Y is pentyl, and Z is an octyl moiety.

8. An imaging member in accordance with claim 7 wherein m, n and o represent the number of monomer segments present in the polymer and are each equal to 33.3 percent.

9. An imaging member in accordance with claim 4 wherein the charge transport layer comprises aryl amine molecules of the formula

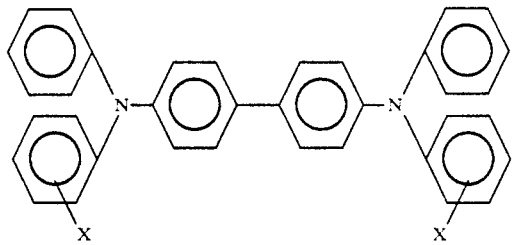

wherein X is selected from the group consisting of alkyl and halogen.

10. An imaging member in accordance with claim 1 wherein the thermotropic liquid crystalline polymer is a copolyester as illustrated in FIG. 16 wherein R and R' are independently selected from the group consisting of hydro, chloro, bromo, iodo, nitro, sulfoxy, hydroxy, alkyl and alkylene alkoxy and aryloxy, and X, Y and Z are independently selected from the group consisting of alkyl and alkylene groups.

11. An imaging member in accordance with claim 1 wherein a liquid crystalline polymer with a molecular weight of from about 1,000 to about 200,000 is selected.

12. An imaging member in accordance with claim 1 wherein the charge transport layer is comprised of aryl amine molecules of the formula

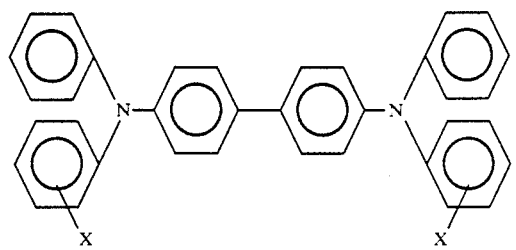

dispersed in a highly insulating and transparent organic resinous binder wherein X is selected from the group consisting of alkyl and halogen.

13. An imaging member in accordance with claim 12 wherein X is selected from the group consisting of ortho(CH₃), meta(CH₃), para(CH₃), ortho(Cl), meta(Cl), or para(Cl).

14. A method of imaging or printing which comprises generating an image on the imaging member of claim 1; developing the image generated; transferring the developed image to a suitable substrate; and thereafter affixing the image thereto.

15. A photoconductive imaging member comprised of a supporting substrate, a photogenerating layer, and a charge transport layer comprised of aryl amine hole transport molecules dispersed in a resin binder mixture wherein at least one of the resins is a liquid crystalline polymer.

16. An imaging member in accordance with claim 15 wherein the resin mixture is comprised of a polycarbonate and a thermotropic liquid crystalline polymer.

Figure 5:
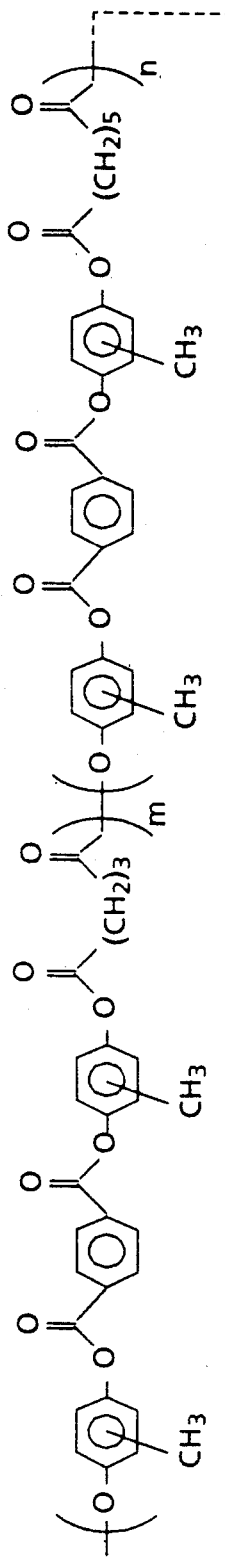
Figure 5:
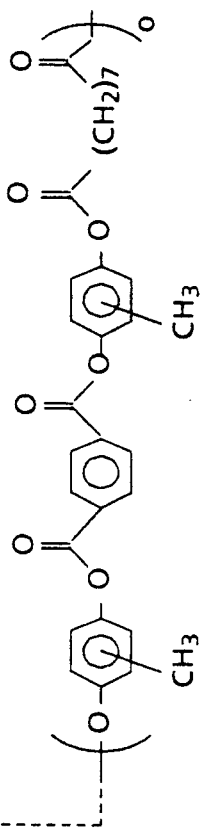

17. An imaging member in accordance with claim 16 wherein the thermotropic liquid crystalline polymer is copoly-(ester)-copoly-(carbonate) as illustrated in FIG. 5, wherein X and Y are independently selected from the group consisting of hydro, chloro, bromo, iodo, nitro, sulfoxy, hydroxy, alkyl, alkylene groups, alkoxy and aryloxy.

18. An imaging member in accordance with claim 15 wherein the photogenerating layer is selected from the group consisting of inorganic photogenerating pigments, and organic photogenerating pigments, and mixtures thereof.

19. An imaging member in accordance with claim 18 wherein the inorganic pigments are selected from the group consisting of selenium, and selenium alloys.

20. An imaging member in accordance with claim 18 wherein the organic pigments are selected from the group consisting of metal phthalocyanines, metal free phthalocyanines, squaraines, perylenes, and vanadyl phthalocyanine.

21. An imaging member in accordance with claim 18 wherein the charge transport layer is comprised of aryl amine molecules of the formula

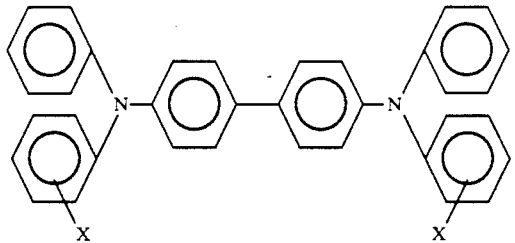

dispersed in a highly insulating and transparent organic resinous binder wherein X is selected from the group consisting of alkyl and halogen.

Figure 4:
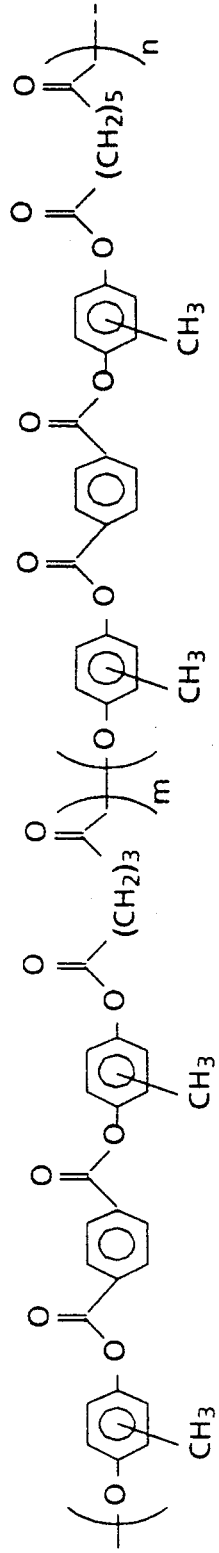
Figure 4:
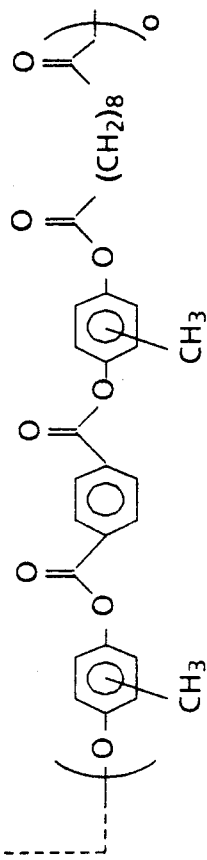

22. An imaging member in accordance with claim 15 wherein the thermotropic liquid crystalline polymer is copolycarbonate as illustrated in FIG. 4, wherein R and R' are selected from the group consisting of hydro, chloro, bromo, iodo, nitro, sulfoxy, hydroxy, alkyl, alkylene, alkoxy and aryloxy.

23. An imaging member in accordance with claim 22 wherein R is a methyl group, and R' is hydrogen.

24. An imaging member in accordance with claim 15 wherein the liquid crystalline polymer is represented by the forumulas of FIGS. 1, 2, 3, 4, 5, 6, 7, 8, 9, 10, 11, 12, 13, 14, 15 or 16 wherein X, Y and Z are independently selected from the group consisting of alkyl, alkylene, substituted alkyl, and substituted alkylene; R and R' are independently selected from the group consisting of hydrogen, hydroxyl, halogen, nitro, alkoxy, arylalkoxy and alkyl; and m, n and o represent the number of monomer segments.

Figure 6:
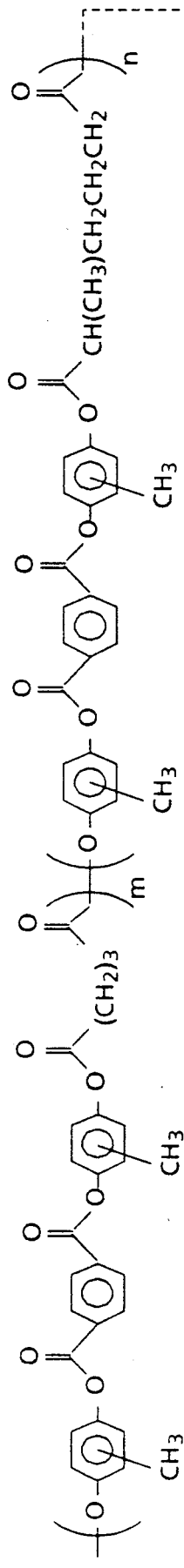
Figure 6:
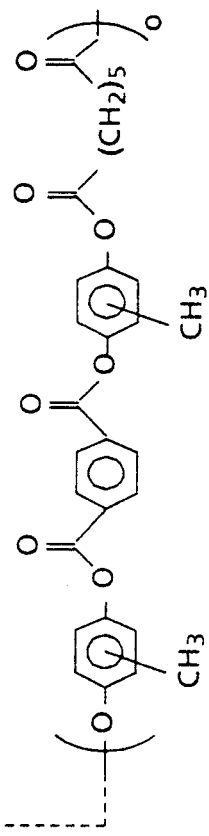
Figure 7:
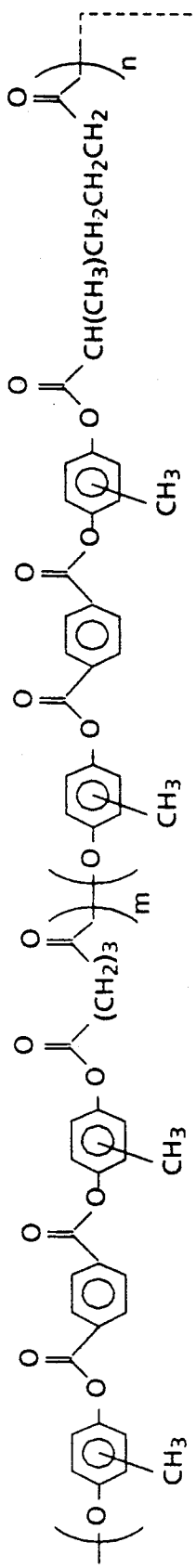
Figure 7:
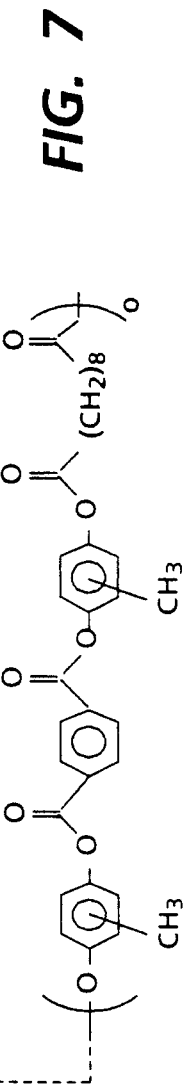
Figure 8:
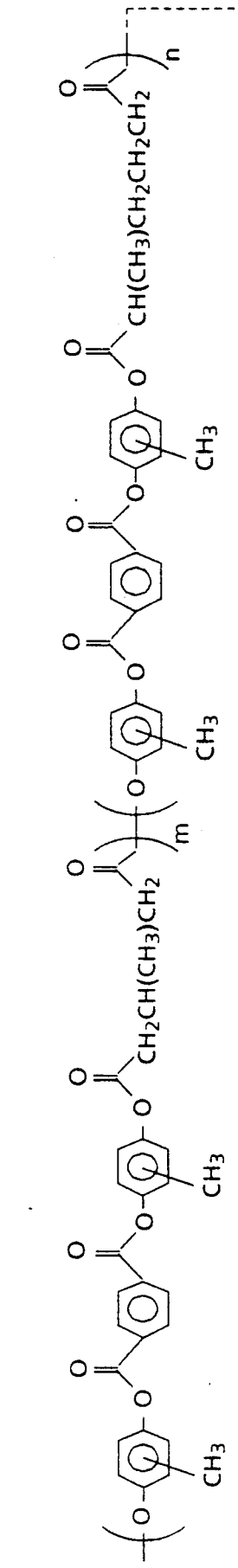
Figure 8:
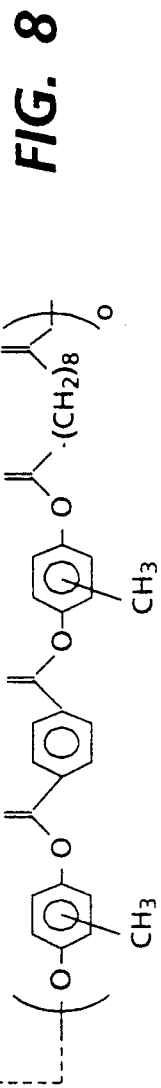
Figure 9:
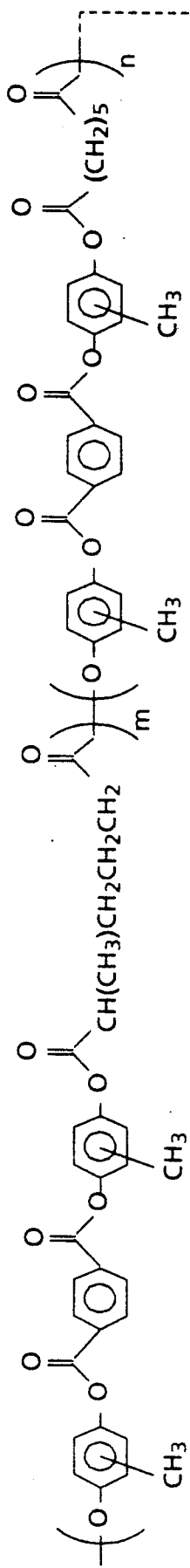
Figure 9:
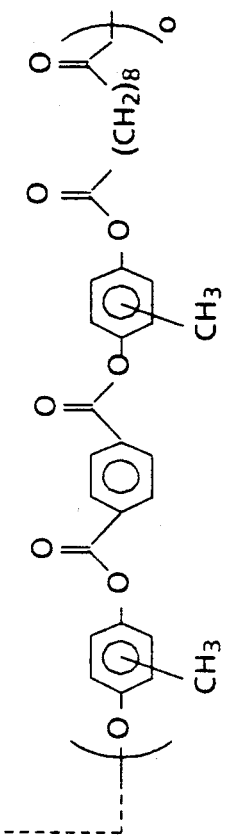
Figure 10:
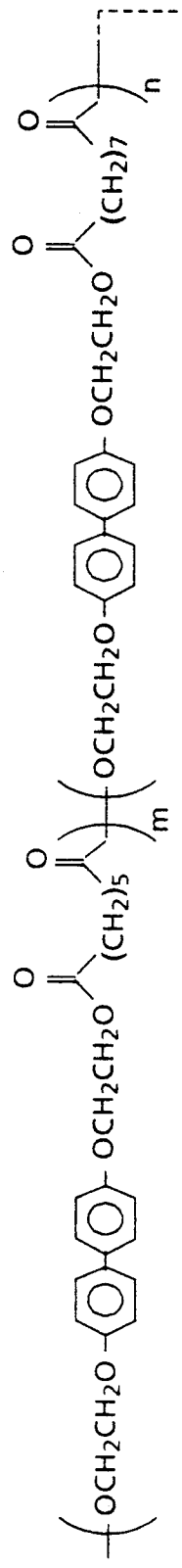
Figure 10:
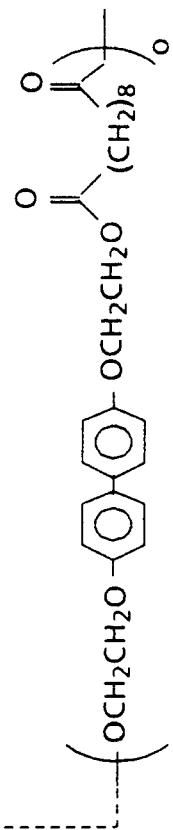

25. An imaging member in accordance with claim 15 wherein the liquid crystalline polymer is a copolyester as illustrated in FIG. 6, whereby X, Y and Z are independently selected from the group consisting of alkyl, alkylene, alkoxy and arylalkoxy, and m, n and o represent the number of monomer segments present in the copolymer, and the sum thereof is equal to 100 percent.

26. An imaging member in accordance with claim 15 wherein the liquid crystalline polymer is a copolyester as illustrated in FIG. 23, wherein R is selected from the group consisting of hydro, chloro, bromo, iodo, nitro, sulfoxy, hydroxy, alkyl, alkylene, alkoxy and aryloxy; and X, Y and Z are independently selected from the group consisting of alkyl, alkylene, alkoxy and arylalkoxy.

27. An imaging member in accordance with claim 15 wherein the liquid crystalline resin is dispersed in the photogenerating layer in an amount of from about 0.1 to about 50 percent by weight.

28. An imaging member in accordance with claim 15 wherein the liquid crystalline resin is dispersed in the photogenerating layer in an amount of from about 0.5 to about 10 percent by weight.

29. An imaging member in accordance with claim 15 wherein the photogenerating layer is situated between the supporting substrate and the charge transport layer.

30. An imaging member in accordance with claim 15 wherein the hole transport layer is situated between the supporting substrate and the photogenerating layer.

31. An imaging member in accordance with claim 15 wherein the supporting substrate is a conductive metallic substance, or an insulating polymeric composition overcoated with an electrically conductive layer.

32. An imaging member in accordance with claim 31 wherein the supporting substrate is aluminum, an organic polymeric composition, aluminized Mylar, titanized Mylar or zirconized Mylar.

33. An imaging member in accordance with claim 15 wherein the photogenerating layer is comprised of pigments dispersed in a resinous binder in an amount of from about 5 percent by weight to about 95 percent by weight.

34. An imaging member in accordance with claim 33 wherein the resinous binder is a polyester, poly(vinylbutyral), polycarbonate, poly(vinylformal), poly(vinylcarbazole), poly(vinylchloride), or mixtures thereof.

35. An imaging member in accordance with claim 15 wherein the crystallization of the charge transport molecule is avoided or minimized by the liquid crystalline resin.

36. An imaging member in accordance with claim 35 wherein high photosensitivity, low dark decay values, low residual potentials and high cyclic stability are achieved after extended imaging cycles of from 50,000 to about 200,000.

37. An imaging member in accordance with claim 15 wherein the crystallization of the charge transport molecule is avoided or minimized during a spray coating process in fabricating the photogenerating layer.

38. An imaging member in accordance with claim 15 wherein from about 35 to about 50 percent of charge transport molecule is dispersed in a mixture of resin, one of which is a thermotropic liquid crystalline polymer, and whereby crystallization of the charge transport layer is minimized or avoided during a spray coating process in fabricating the photogenerating layer.

39. An imaging member in accordance with claim 15 wherein the crystallization of the charge transport molecule is avoided or minimized during dip coating process in fabricating the photogenerating layer.

40. An imaging member in accordance with claim 15 wherein high photosensitivity, low dark decay values, low residual potentials and high cyclic stability are achieved after extended imaging cycles of from about 50,000 to about 200,000.

41. An imaging member in accordance with claim 15 wherein the charge transport layer is comprised of aryl amine molecules of the formula

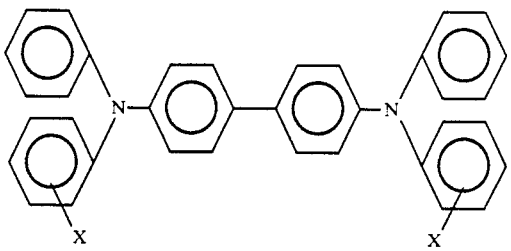

dispersed in a highly insulating and transparent organic resinous binder wherein X is selected from the group consisting of alkyl and halogen.

42. An imaging member comprised of (1) a supporting substrate; (2) a siloxane hole blocking layer; (3) a photogenerating layer; and (4) an aryl amine hole transport layer comprised of hole transport molecules dispersed in a resin binder mixture wherein at least one resin is a liquid thermotropic crystalline polymer.

43. An imaging member in accordance with claim 42 wherein there is included between the siloxane hole blocking layer and the photogenerating layer an adhesive layer.

44. An imaging member in accordance with claim 42 wherein the adhesive layer is a polyester, a polycarbonate, a polyether, or a polyamide resin, and mixtures thereof.

45. An imaging member in accordance with claim 42 wherein the liquid crystalline polymer inhibits, minimizes or avoids crystallization of the aryl amine hole transport molecule.

46. A photoresponsive imaging member comprised of a photogenerating layer, and a charge transport layer comprised of aryl amine hole transport molecules dispersed in a resin binder comprised of a first resin and a second liquid crystalline thermotropic polymer.

* * * * *